(12) United States Patent
Swift et al.

(10) Patent No.: US 7,445,250 B2
(45) Date of Patent: Nov. 4, 2008

(54) QUICK CONNECT COUPLING

(75) Inventors: Jonathan Clark Swift, Cambridge (GB); Geoffrey Richard Keast, Molesworth (GB)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 11/217,751

(22) Filed: Sep. 1, 2005

(65) Prior Publication Data
US 2006/0061097 A1   Mar. 23, 2006

Related U.S. Application Data

(60) Provisional application No. 60/610,680, filed on Sep. 17, 2004.

(51) Int. Cl.
*F16L 39/00* (2006.01)
(52) U.S. Cl. .................. 285/321; 285/39; 285/277; 285/307; 285/308; 285/314
(58) Field of Classification Search ......... 285/276–277, 285/305, 307–308, 314–316, 321, 39
See application file for complete search history.

(56) References Cited

U.S. PATENT DOCUMENTS

| | | | | |
|---|---|---|---|---|
| 2,436,206 A | * | 2/1948 | Deming | 137/614.03 |
| 2,461,705 A | * | 2/1949 | Stranberg | 137/614.04 |
| 2,568,516 A | * | 9/1951 | Scheiwer | 251/149.6 |
| 2,837,352 A | * | 6/1958 | Wurzburger | 285/93 |
| 3,314,447 A | * | 4/1967 | Collar et al. | 137/614.06 |
| 3,773,360 A |  | 11/1973 | Timbers |  |
| 3,997,196 A | * | 12/1976 | Karcher et al. | 285/86 |
| 4,063,760 A | * | 12/1977 | Moreiras | 285/242 |
| 4,135,745 A | * | 1/1979 | Dehar | 285/319 |
| 4,217,101 A | * | 8/1980 | Loge | 433/126 |
| 4,278,276 A | * | 7/1981 | Ekman | 285/49 |
| 4,403,959 A | * | 9/1983 | Hatakeyama | 433/126 |
| 4,578,034 A | * | 3/1986 | Shibata et al. | 433/29 |
| 4,645,245 A |  | 2/1987 | Cunningham | 285/321 |
| 4,750,765 A | * | 6/1988 | Cassidy et al. | 285/321 |
| 4,872,710 A | * | 10/1989 | Konecny et al. | 285/81 |
| 4,949,745 A | * | 8/1990 | McKeon | 137/15.09 |
| 5,054,952 A |  | 10/1991 | Chara | 403/326 |
| 5,553,895 A |  | 9/1996 | Karl et al. | 285/39 |
| 5,570,910 A | * | 11/1996 | Highlen | 285/308 |

(Continued)

FOREIGN PATENT DOCUMENTS

DE   20 2005 005 319 U1   7/2005

(Continued)

*Primary Examiner*—Aaron Dunwoody
*Assistant Examiner*—Fannie Kee
(74) *Attorney, Agent, or Firm*—J. L. Mahurin, Esq.; J. A. Thurnau, Esq.; P. N. Dunlap, Esq.

(57) ABSTRACT

A quick to connect and quick to disconnect fluid coupling has a clip, a male portion having an annular groove adapted to receive the clip, a female portion, and a sealing element. It is improved by the female portion having a dual function frustoconical portion adapted to compress the sealing element during joinder of the male portion with the female portion as well as to compress the clip into the annular groove in preparation of separating the male portion from the female portion. Further, a sleeve is slideably placed about the male portion and adapted to capture the clip compressed within the annular groove.

13 Claims, 3 Drawing Sheets

U.S. PATENT DOCUMENTS

| | | |
|---|---|---|
| 6,186,557 B1 | 2/2001 | Funk |
| 6,319,001 B1 * | 11/2001 | Esrock ........................ 433/80 |
| 6,450,545 B1 * | 9/2002 | LeMay et al. .................. 285/93 |
| 2005/0161938 A1 | 7/2005 | Dahms ........................ 285/39 |

FOREIGN PATENT DOCUMENTS

| | | |
|---|---|---|
| DE | 20 2005 000 750 U1 | 7/2006 |
| JP | 06185682 | 8/1994 |
| SU | 1838677 A3 | 8/1990 |

\* cited by examiner

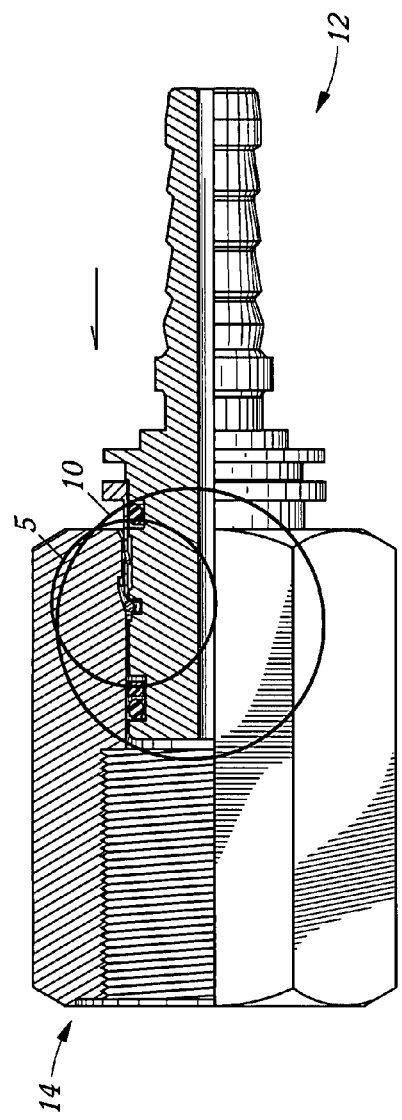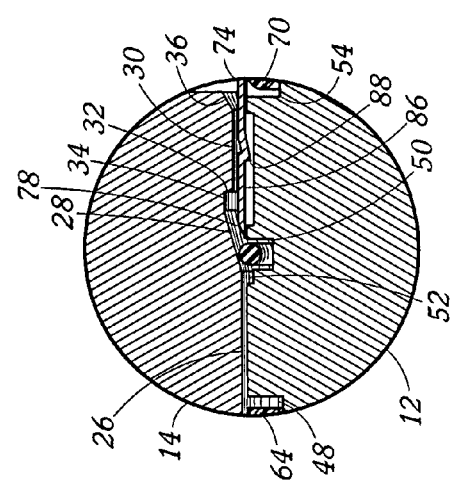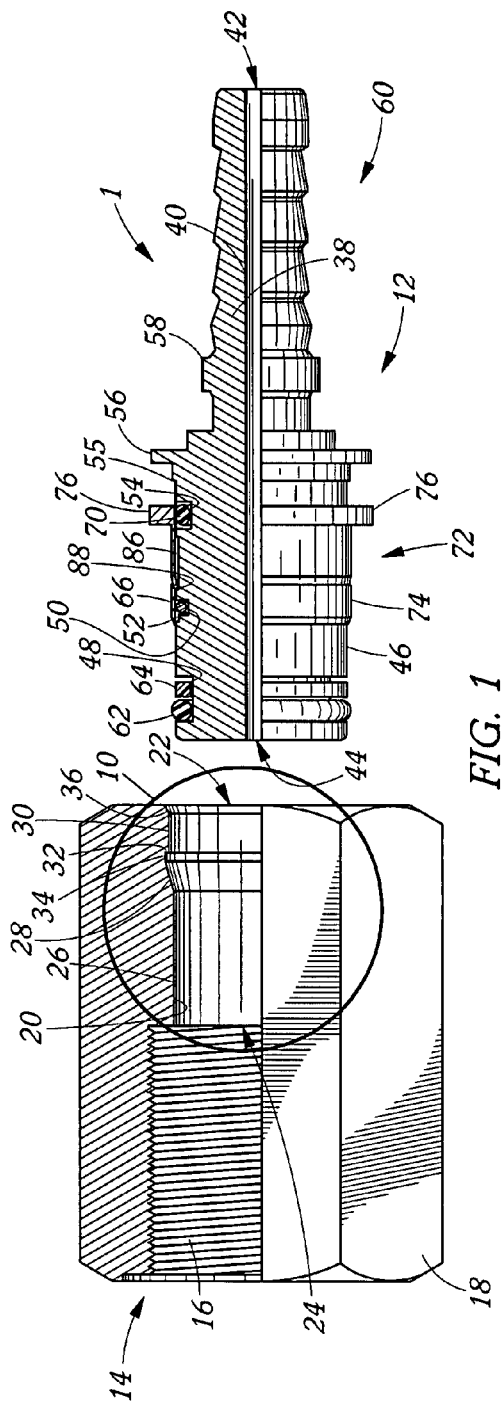

QUICK CONNECT COUPLING

CROSS-REFERENCE TO RELATED APPLICATIONS

This application claims priority to U.S. Provisional Patent Application Ser. No. 60/610,680, filed Sep. 17, 2004 and entitled QUICK CONNECT COUPLING. The subject matter of this application is incorporated herein by this reference.

BACKGROUND OF THE INVENTION

1. Field of the Invention

This invention relates generally to flexible hose couplings. More particularly, it relates to a novel and improved quick connect hose couplings. Specifically, it relates to an improved push-to-connect and quick to disconnect flexible hose coupling.

2. Description of the Prior Art

Quick connect couplings are known. In such couplings a port adapter may include the female portion or port and be pre-assembled on an associated fixture, machine or equipment or the female portion or port may be machined as part of associated fixtures, machinery or equipment. The hose connection or male portion or hose stem, including a hose insert portion and a ferrule, are attached to an open end of the hose to be connected to the fixture, machinery or equipment. The hose stem portion has a hose insert portion, which is inserted into the open end of the hose. The ferrule is then compressed about the hose end containing the insert causing all portions to be permanently affixed. Merely pressing the hose connection portion into the female portion or port subsequently completes the hose connection. Such quick connect couplings are particularly desirable when the hose must be connected in a location which is not readily accessible since it eliminates the need for starting the threads and the danger of cross threading and eliminates the need to use a related tool which might not fit in the available space. Since the port adapter may be threaded into place as a pre-assembly operation, or the port preexisting in the associated fixture, machine or equipment, it is easy to insure that the port is proper and ready. Further, the time of assembly and, in turn, the assembly costs are reduced.

Historically, the considerations that have driven the design of such couplings have included complexity of port design, effecting machineability, complexity of stem design, complexity and location of sealing elements such as o-rings or other shape of seals, complexity and location of locking components such as clips of various shapes, total number of components needed to complete the coupling, and interplay of the geometry of the port and the stem. All of these have greatly affected the cost of producing such couplings which impacts greatly upon their economic viability.

It has also been important to ensure that such couplings can be used safely and reliably. Obviously, one of the primary purposes of such couplings is to provide a long lasting leak-free connection. However, over time, increasing emphasis has been placed upon safety. The quick disconnect characteristic of such couplings necessarily give rise to a greater opportunity for inadvertent and sudden disconnects, with grave results. This is particularly true in the environments where use of such couplings is especially appealing. These include industrial or heavy machinery locations where installations of fluid connections are numerous, dense, and almost inaccessible, having movement of many hard and heavy objects nearby, including the fixtures upon which the couplings are often attached. Unexpected impacts upon quick to disconnect couplings or maintenance in such difficult quarters can increase the likelihood of inadvertent disconnects. Inadvertent disconnects on pressurized systems can lead to damaged or broken machines, destroyed premises, severe injuries to maintenance or other workers, or even death, such as through unexpected machinery movement or spray of very hot fluids at high pressure.

One example of a push to connect and quick to disconnect coupling can be found in U.S. Pat. No. 3,773,360 to Timbers, which is incorporated herein by this reference. It appears to be an attempt to provide both straight-forward push to connect and quick to disconnect processes while simplifying port and stem design to contain cost. Timbers '360 discloses the advantage of a simple port design where no sealing or locking components or clips are integral. However, the disclosed stem is more complex including all sealing and locking components. Further, the locking component is intricate and relatively complex. Significantly, the disclosed coupling requires an additional component, or stop member, to make the coupling resistant to inadvertent disconnection. The complexity and additional components would increase the cost of the coupling.

The coupling of Timbers '360 completes its fluid connection by simply pressing the male portion into the female portion. With the stop member removed, the coupling is disconnected by additional insertion of the male portion into the female portion into closer engagement. This causes the port to compress the locking component. The unique and intricate shape of the locking component then allows it to grab unto the stem and stay compressed such that its locking function is deactivated. The two portions are then separated.

It was apparently contemplated that the coupling of Timbers would be inadvertently disconnected too easily to be safe in many environments. Accordingly, the stop member was included in the disclosure. The stop member interferes with the male and female portions being pressed into closer engagement by filling space between the female and male portions. It would appear that the coupling with the stop member in place is resistant to inadvertent disconnection.

However, both the use and shape of the stop member leaves substantial opportunity for the coupling to experience disastrous inadvertent disconnection. First, there is no way to ensure that the stop member will be properly installed on the coupling during the entire time of its deployment. The stop member could be absent from the beginning or removed at any time during the life of the coupling leaving no tell-tale sign that anything is amiss. In such a condition the coupling would no longer be resistant to inadvertent disconnection. Second, the disclosed shape of the stop member includes a loop that extends radially away from the coupling. In the environments described above as those where the use of a quick to connect and quick to disconnect coupling is especially appealing, the loop would be subject to gathering debris or other being hooked by moving objects. This gives rise to substantial opportunity for the stop member to be stripped from the coupling. Once again, the coupling would no longer be resistant to inadvertent disconnection.

Safety is also compromised by the existence of such a rigid loop in many industrial or heavy machinery environments. It can be a direct source of damage or injury through the entanglement of debris, tools, clothing, hair or fingers. Further, it is not inconsequential that every time the coupling is to be disconnected, the metal loop, comprising the stop member, is removed to become lost as hazardous debris.

Accordingly, there remains the need for a quick to connect and quick to disconnect coupling having simplified design for economic viability, but more importantly, exhibiting greatly enhanced safety by being highly resistant to inadvertent disconnection without relying on human intervention to ensure all safety components are present upon the coupling, not having dangerous external shapes, and not adding to the opportunity for distribution of dangerous debris.

SUMMARY OF THE INVENTION

The present invention has as an object the provision of a quick connect and quick to disconnect hose coupling with an improvement in safety while retaining economical production and the benefits of such couplings.

The present invention is an improved quick to connect and quick to disconnect fluid coupling of the type having a clip, a male portion having an annular groove adapted to receive the clip, a female portion, and a sealing element. It is improved by the female portion having a dual function frustoconical portion adapted to compress the sealing element during joinder of the male portion with the female portion as well as to compress the clip into the annular groove in preparation of separating the male portion from the female portion. Further, a sleeve is slideably placed about the male portion and adapted to capture the clip compressed within the annular groove.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings:

FIG. 1 is an elevation, with one quarter cut-away, of a preferred embodiment decoupled or disconnected;

FIG. 4 is an elevation, with one quarter cut-away, of a preferred embodiment prepatory to decoupling or disconnection operation;

FIG. 5 is an exploded detail, from FIG. 4;

DETAILED DESCRIPTION OF THE PREFERRED EMBODIMENTS

Figure 2:
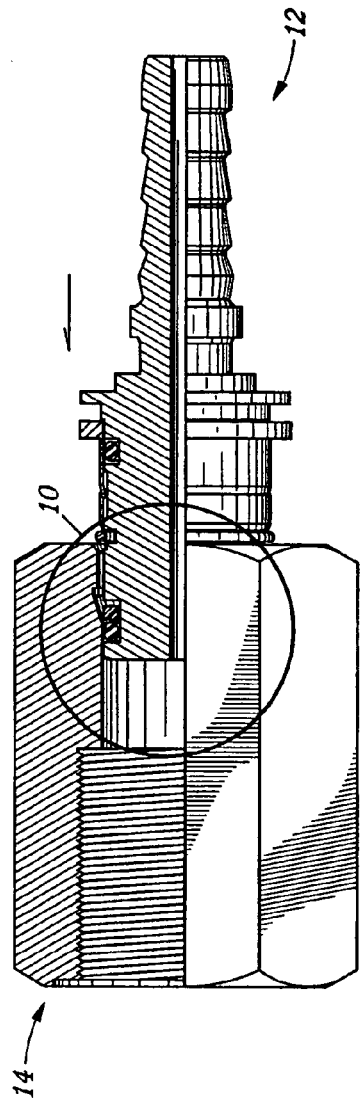
FIG. 2 is an elevation, with one quarter cut-away, of a preferred embodiment during coupling operation (insertion)

Referring to FIG. 1, a preferred embodiment of this quick connect coupling 1 of the instant invention includes female portion or port 10 and hose stem 12. The female portion or port 10 is illustrated as part of an adapter 14 having threads 16 and formed with wrenching flats 18, as one contemplated embodiment and for convenience of illustration. Commonly, port 10 is expected to be machined into the body of a fixture, machine or equipment not depicted. For those instances where port 10 is formed into an adapter 14, adapter 14 provides the base for port 10. For those instances where port 10 is formed into a fixture, machine or equipment, these provide the base. Port 10 has an interior surface 20 defining an inlet opening 22, an outlet opening 24, a fluid passage 26, a first frustoconical ramp 28, a first cylinder 30, annular wall 32, second frustoconical ramp 36, and optionally second cylinder 34. First frustoconical ramp 28 is a dual function ramp serving functions in both the connection and disconnection operations, to be described later. Second frustoconical ramp 36 is a lead-in ramp, significant to connection operation described later.

Still referring to FIG. 1, hose stem 12 includes shaft 38 with a bore 40 having a stem inlet opening 42 and a stem outlet opening 44. The shaft has an exterior surface 46 defining a first annular seal groove 48, an annular clip groove 50, an annular step groove 52, a second annular seal groove 54, sleeve abutment 55, debris barrier 56, hose stop 58, hose insert 60, and annular retaining groove 86.

Hose insert 60 would be placed in an opened end of a hose, not depicted, that would carry the subject fluid. Insertion would normally progress until the end of the hose met the hose stop 58. The hose would be affixed in common manner with a clamp or ferrule, not depicted.

First annular seal groove 48 carries first seal 62 and seal backing 64. First seal 62 is a sealing element in the form of an o-ring. Seal backing 64 serves to increase the pressure at which the coupling can operate without fluid leaking past first seal 62. Other available seal designs are also contemplated.

Figure 6:
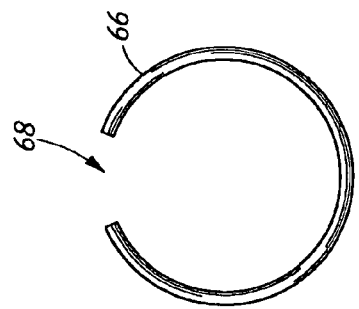
FIG. 6 is a plan view of a locking element in the simplified form of a snap-ring.

Clip 66 is a locking element in the simplified form of a snap-ring having gap 68, depicted in FIG. 6. Other clip shapes, such as with a square as opposed to a round cross section are also contemplated. Clip 66 is sized small enough that gap 68 must be enlarged to allow clip 66 to be large enough to pass over external surface 46. However, clip 66 must also be large enough that gap 68 must be reduced to allow clip 66 to pass through first cylinder 30. It is preferred that clip 66 is sized large enough that it completely fills the void created by first ramp 28 and optionally by second cylinder 34. When so sized, it additionally acts as a wear buffer prolonging the life of coupling 1 by minimizing the wearing of port 10. This feature is discussed more fully below. Gap 68 must be large enough to allow adequate reduction of clip 66 within clip groove 50. Clip 66 is initially carried loosely in clip groove 50.

Second annular seal groove 54 carries second seal 70, also an o-ring. A capture sleeve 72 is mounted upon exterior surface 46 in slideable relation to stem 12. Sleeve 72 has capture cylinder 74 and shoulder 76. Capture cylinder 74 includes one or more press spots 88 which is the result of a crimping or pressing operation, and function as restraining detents. It is also contemplated that these restraining detents could be formed by machining or molding similar shapes into capture cylinder 74. Press spots 88 are diminutive to allow sleeve 72 to be slid into place upon exterior surface 46. Once so placed, the interaction of retaining groove 86 and press spot 88 restricts sleeve 72 from being removed from exterior surface 46. When sleeve 72 is moved against sleeve abutment 55, second seal 70 is captured under sleeve cylinder 74. Clip 66 is not (see FIG. 2). When sleeve 72 is moved toward stem outlet 44, as depicted in FIG. 1, clip 66 is captured by sleeve cylinder 74 within clip groove 50. Second seal 70 both seals the interface between exterior surface 46 and sleeve 72 against movement of contaminants, and provides friction to dampen movement of sleeve 72. A third seal 80 is placed about capture cylinder 74 to span the gap between shoulder 76 and port 10 when coupling when coupling 1 is connected. Third seal 80 seals the interface of capture cylinder 74 and second ramp 36 against movement of contaminants.

Figure 3:
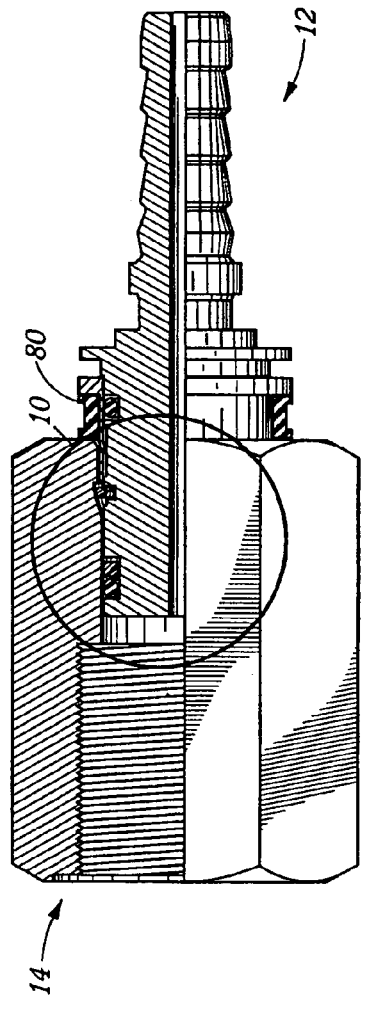
FIG. 3 is an elevation, with one quarter cut-away, of a preferred embodiment upon coupling.

Connection of coupling 1 is effected by inserting stem 12 into port 10 as depicted in a beginning phase as regards the relationship of stem 12 to port 10 in FIG. 2. Note, in the preferred configuration in preparation of connection, clip 66 is captured by sleeve 72, as depicted in FIG. 1. The insertion continues to the position depicted in FIG. 3. During this insertion, first seal 62 is guided by second ramp 36 into alignment with first cylinder 30. First seal 62 is then compressed by first ramp 28 so that first seal 62 can move into a satisfactory sealing position between stem 12 and fluid passage 26. It is because of this sealing relationship that fluid passage 26 can also be referred to as a sealing bore. Sleeve 72 is also guided by second ramp 36 into alignment with first cylinder 30. As insertion progresses, sleeve lead-in 78 abuts first ramp 28. After abutment of sleeve lead-in 78 and first ramp 28, insertion of shaft 38 continues even though insertion of sleeve 72 is halted by this abutment. This results in sleeve 72 moving toward sleeve abutment 55, relatively, and releasing clip 66. Clip 66 is now captured only by passage 26. Stem 12 is then retracted to the point depicted in FIG. 3, where clip 66 expands into the void left by first ramp 28 and optionally second cylinder 34. Stem 12 and port 10 are now in axial locking relationship. If a force is applied to stem 12 to expel or pull it from port 10, such as under the influences of fluid pressure or pulling upon stem 12 ("non-allowed separation"), clip 66 will be pressed into step groove 52 by wall 32. Clip 66 will then be jammed between step groove 52 and wall 32. Retraction of stem 12 from port 10 will not be allowed.

Repeated attempts for non-allowed separation of coupling 1 while in the axial locking relationship, would wear upon wall 32, and clip groove 50 but for the sizing of clip 66 described earlier and the presence of step groove 52. Sizing clip 66 largely enough to fit snugly in the void left by first ramp 28 and second cylinder 34, causes clip 66 to provide the additional function of a protective insert. A smaller sizing would allow clip 66 to work against wall 32 under the influences of non-allowed separation, wearing the material in which port 10 is formed, which is commonly softer than the material from which clip 66 is formed. The addition of step groove 52 causes the wear to occur in an orderly manner that gives indication of wear, by stem 12 seating in a less inserted manner in port 10 when in axial locking relationship, without a catastrophic failure of coupling 1.

Capture cylinder 74 of sleeve 72 fills the space between external surface 46 and first cylinder 30, stabilizing stem 12 against lateral movement in relation to port 10. Accordingly, first cylinder 30 can be referred to as a stabilizing bore.

It is contemplated that insertion could be accomplished from a beginning point depicted in FIG. 2 and with capture sleeve 72 abutting sleeve abutment 55. In this configuration clip 66 is not captured by sleeve 72 prior to connection. However, this increases the force required for connection. In this instance, insertion forces would include not only the force necessary to compress first seal 62 by second ramp 36 and by first ramp 28 in sequence, but the additional force necessary to compress clip 66 by second ramp 36. The force required to compress clip 66 by second ramp 36 can be substantial. By contrast, it can be seen that connection utilizing the preferred configuration where clip 66 is captured by capture sleeve 72 requires substantially lees insertion force.

Figure 7:
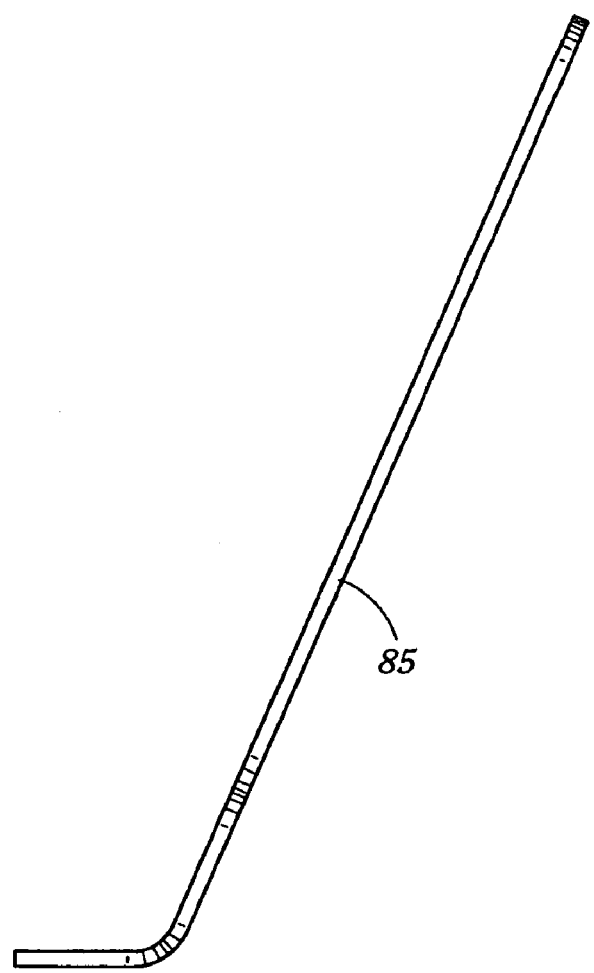
FIG. 7 is an elevation of a disconnect tool.
Figure 8:
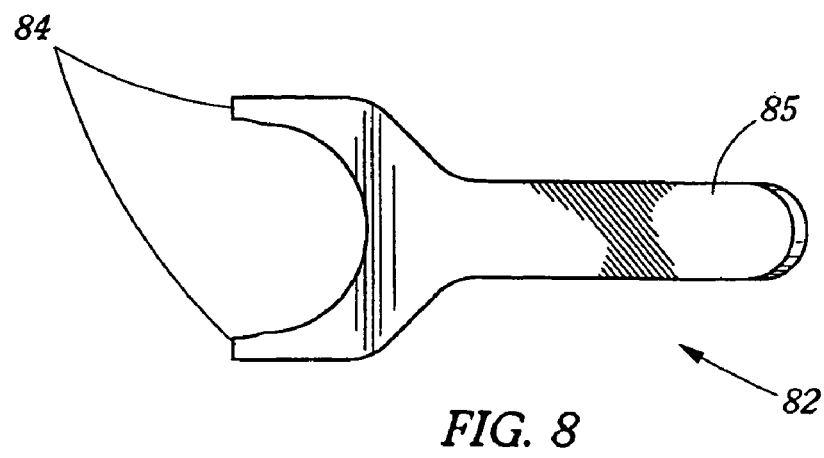
FIG. 8 is a plan view of a disconnect tool.

Disconnection of coupling is effected by first increasing the insertion of stem 12 into port 10 as depicted by the arrow in FIG. 4. FIGS. 4 and 5 depict an intermediate position. First ramp 28 displaces clip 66 from step groove 52 toward clip groove 50 and then compresses clip 66 into clip groove 50. During this operation first ramp 28 can be regarded as a disconnection ramp. Insertion continues until sleeve lead-in 78 abuts first ramp 28, and clip 66 is compressed to a size that fits within passage 26. Sleeve 72 is then axially moved to the position depicted in FIG. 1, in relation to stem 12 to capture clip 66. This is effected, not by moving sleeve 72 in the direction of the arrow, but rather by holding it steady while shaft 38 is retracted opposite of the direction indicated by the arrow. In practice this is accomplished by applying a wedging action between shoulder 76 and debris barrier 56. A tool such as a blade screw driver can provide the wedging action by inserting the blade between shoulder 76 and debris barrier 56 and twisting. As the tool is of common design, it is not depicted. The special purpose tool 82 depicted in FIGS. 7 and 8 can also provide the wedging action. Tines 84 are inserted between debris barrier 56 and shoulder 76. Special purpose tool 82 is then rocked by applying pressure to handle 85 to provide the wedging action. Once clip 66 is thus captured under sleeve 72, the jamming of clip 66 between wall 32 and step groove 52 cannot occur. The stem 12 becomes free to be disconnected from port 10. Stem 12 is retracted from port 10.

There are several subtle aspects to the instant invention that make it essentially fail safe against inadvertent disconnection. Primarily, disconnection requires a combination of actions that will not occur naturally. Merely pushing upon stem 12 has no effect upon causing disconnection. Even pushing upon both stem 12 and shoulder 76 will not lead to disconnection. Disconnection requires the concerted efforts of pushing stem 12 into port 10 and wedging shoulder 76 apart from debris barrier 56. Further, urging capture cylinder toward the clip capture position without first increasing the insertion of stem 12 into port 10 is completely ineffective for two complementary reasons. One, sleeve lead-in 78 would actually tend to move clip 66 farther out of clip groove 50 as well as back toward step groove 52. Two, step groove 52 is too shallow to allow clip 66 to be compressed to a size that fits within passage 26. It can further be seen that sleeve shoulder 76 does not extend beyond the reach of debris barrier 56. According, sleeve 72 does not lend itself to being simply grabbed and pushed into this clip capture position.

These subtleties allow the production of a quick to connect and quick to disconnect coupling that represents a dramatic leap forward in the safety of such couplings while keeping all of the desirable features. Further, they have led to such couplings without the additional hazards described in the Timbers '360(i.e., hazards loops and potentially hazardous debris).

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

We claim:

1. An improved quick to connect and quick to disconnect fluid coupling having a clip, a male portion having an annular clip groove adapted to receive said clip, a female portion, and a sealing element, the improvement comprising:
   said female portion having a dual function frustoconical ramp adapted to compress said sealing element during joinder of said male portion with said female portion and to compress said clip into said annular clip groove in preparation of separating said male portion from said female portion; and,
   a sleeve slideably placed about said male portion and adapted to capture said clip compressed in said annular clip groove.

2. The improved fluid coupling of claim 1 further comprising said male portion having an annular step groove adjacent to said annular clip groove.

3. The improved coupling of claim 1, further comprising said clip being a snap-ring.

4. The improved fluid coupling of claim 1 wherein said female portion further comprises:
- a base portion having an interior surface defining a bore with a substantially circular inlet opening and a substantially circular outlet opening;
- said bore including a fluid passage proximate said outlet opening and having a first radius;
- said dual function frustoconical ramp expanding radially from said first radius to a second radius toward said inlet opening;
- a first cylinder having a third radius progressing axially toward said inlet opening;
- an annular wall progressing radially from said second radius to said third radius;
- a second frustoconical ramp expanding radially from said third radius while extending axially toward said inlet opening; and,
- said second radius being larger than said third radius.

5. The improved fluid coupling of claim 4 further comprising said dual function frustoconical ramp being adjacent to said fluid passage.

6. The improved fluid coupling of claim 4 further comprising a second cylinder progressing axially from said dual function frustoconical ramp toward said inlet opening with said second radius.

7. The improved fluid coupling of claim 6 further comprising said second cylinder being axially intermediate of said dual function frustoconical ramp and said annular wall.

8. The improved fluid coupling of claim 6 further comprising said annular wall being at the juncture of said first cylinder and said second cylinder.

9. The improved fluid coupling of claim 4 further comprising said third radius being at least as large as said first radius.

10. The improved fluid coupling of claim 1 wherein said male portion further comprises:
- a shaft having a bore coaxial with said shaft and having an inlet opening and an outlet opening;
- said shaft having an exterior surface defining a first annular seal groove axially spaced from said outlet opening;
- said annular clip groove axially spaced from said seal groove and opposite of said outlet opening; and,
- said sleeve slideably mounted upon said exterior surface with freedom of movement to selectively surround said clip groove or be axially spaced from said clip groove opposite of said outlet opening.

11. The improved fluid coupling of claim 10 further comprising said exterior surface defining an annular step groove adjacent said annular clip groove.

12. The improved fluid coupling of claim 10 further comprising said exterior surface defining a second annular seal groove axially spaced from said clip groove and opposite of said outlet opening.

13. The improved fluid coupling of claim 12 further comprising said exterior surface defining a debris baffler axially spaced from said second annular seal groove and opposite of said outlet opening, defining a hose stop axially spaced from said debris baffler and opposite of said outlet opening, and defining a hose insert portion extending axially from said stop to said inlet opening.

* * * * *